United States Patent [19]
Miller

[11] 3,782,482
[45] Jan. 1, 1974

[54] PISTOL-GRIP GARDEN HOE

[76] Inventor: Eugene Boyd Miller, 14515 S. Michigan Ave., Riverdale, Ill. 60627

[22] Filed: May 24, 1972

[21] Appl. No.: 256,393

[52] U.S. Cl. .................................. 172/381, 30/342
[51] Int. Cl. ............................................. A01b 1/08
[58] Field of Search ................... 172/381, 371–380, 172/771; 30/342

[56] References Cited
UNITED STATES PATENTS

| | | | |
|---|---|---|---|
| 355,182 | 12/1886 | Lefavour | 172/371 |
| 472,006 | 3/1892 | Walker et al. | 30/342 X |
| 261,707 | 7/1882 | Haseltine | 172/381 |
| 685,209 | 10/1901 | Hoodless | 172/381 X |
| 324,565 | 8/1885 | Lang | 172/381 |
| 3,232,355 | 2/1966 | Woolworth | 172/378 |

Primary Examiner—Stephen C. Pellegrino
Attorney—Carlton Hill et al.

[57] ABSTRACT

Hand-held hoe for use in cultivating and gardening particularly in close places difficult to cultivate with the average hoe or other cultivating tools. A generally pistol-grip handle affords a pulling and gripping surface for the index finger of the hand and a mounting for a flat blade support member offset from the center of the handle. The handle may be molded about the blade support member and is of a length to fit the average hand. The blade support member extends from the handle and is twisted at different curvatures adjacent the handle to offset the blade support member to extend to the outside of the handle and to add rigidity to the blade support member to accommodate the use of a light gauge steel. Offsetting of the blade member provides a leg portion extending angularly downwardly from the handle in a plane generally parallel to the plane of the handle, which terminates into a right-angled hoeing blade normally inclined at a cutting angle with respect to the ground when hoeing or cultivating, and sharpened along its ground engaging edge. The outer end of the hoeing blade is upturned to provide strength to the blade and prevent twisting thereof during a hoeing or cultivating operation and also to aid in cutting weeds or plants.

6 Claims, 4 Drawing Figures

PATENTED JAN 1 1974 3,782,482

PISTOL-GRIP GARDEN HOE

FIELD OF THE INVENTION

Hand hoe, cultivating and weed-cutting instrument, for use in confined places.

BACKGROUND, SUMMARY AND ADVANTAGES OF INVENTION

Various hand-held garden tools of a size to be operated by the hand, have long been known in the gardening art and are in use at the present time. One such tool is shown in my Design application Ser. No. 125,453, filed Mar. 17, 1971. There has, however, been a distinct need and demand for a stronger, yet simply constructed, easily used tool which is lighter in weight than that of my Design application Ser. No. 125,453 which may efficiently be used by the gardener with one hand and safely afford access to close spaces without damaging other plants, and which may also be used in a sickle-like manner when required or desired.

Many such tools have been in the form of hand hoes in which the support for the cutting blade is at the center of the blade, with a resultant heavy unwieldable tool, or is so far to one side of the blade as to tend to twist in the hand of the user during normal use of the tool and also to bend the tool during use. This twisting besides requiring a heavy tool, requires a firm grip on the tool making it difficult for women to use and also requires the exertion of an unnatural lateral force on the tool to maintain the blade straight, which readily tires the user of the tool.

Other hand tools in use today are heavy and of a relatively complex construction and require a great deal of effort on the part of the user. Still other prior art garden tools have a heavy handle of uniform cross sectional dimensions along its length, requiring the user to tightly grasp the handle and rely only upon the friction between the hand of the user and the handle when manipulating the tool. With such tools, when the hand perspires, as is customary, the tool becomes difficult to hold onto and thereby makes weeding or other chores performed by the tool quite tiring and difficult.

The hand tool of the present invention is arranged to provide a lightweight, strong and easily held tool providing a simple and positive grip for hoeing and the like, in which the handle for the tool is arranged to fit the average hand with comfort and is in the form of a pistol grip providing a positive pulling surface for the index finger on one side of the hoeing blade and a gripping surface for the thumb on the opposite side of the hoeing blade. A blade portion of thin strip material is molded in the handle and is provided with a double twist as it extends from the handle, to position the cutting or hoeing blade at the proper angle with respect to the ground and to add rigidity to the blade portion and make it possible to use a light gauge steel which will withstand rough usage.

A further advantage of the present invention, therefore, is in the simplicity and light weight of the garden tool enhanced by a balanced pistol-grip handle portion, providing a positive grip for the tool without undue exertion of strength, and facilitating the pulling of the tool along the ground in a straight line or any other desired direction without exerting undue forces on the tool, tending to twist the tool or tire the user.

Another advantage of the invention, in addition to the balanced design thereof with the pistol-grip handle, is the disposal of the handle in the plane generally perpendicular to the cutting edge of the tool to position the blade portion of the tool at an efficient cutting angle relative to the ground during normal operation of the tool.

A still further advantage of the invention is that both the cutting edge of the blade of the tool and the side edge of the tool may be sharpened to enable the tool to be used as a sickle when turned with the blade portion of the tool generally parallel to or at an angle with respect to the ground.

A further advantage of the invention is that the handle is disposed toward the transverse center of the blade portion, to relieve the blade portion and handle from lateral twisting forces, and is arranged in an elevated position during operation of the tool to provide ground clearance for the hand of the user, when using the tool as a hoe, cultivator or sickle.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF PREFERRED EMBODIMENT OF INVENTION

Figure 1:
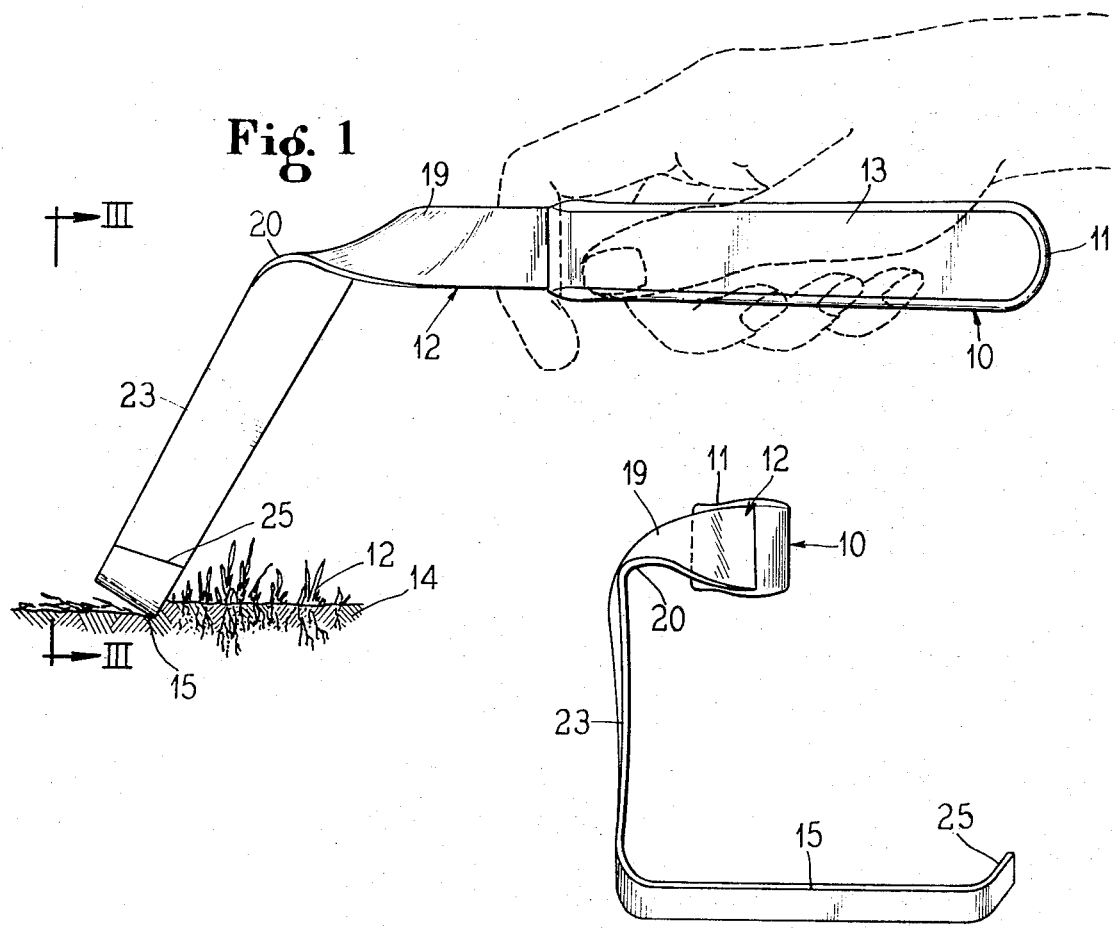
FIG. 1 is a view in side elevation of a hand tool constructed in accordance with the principles of the present invention illustrating the tool in operation in hoeing and weeding.
Figure 3:
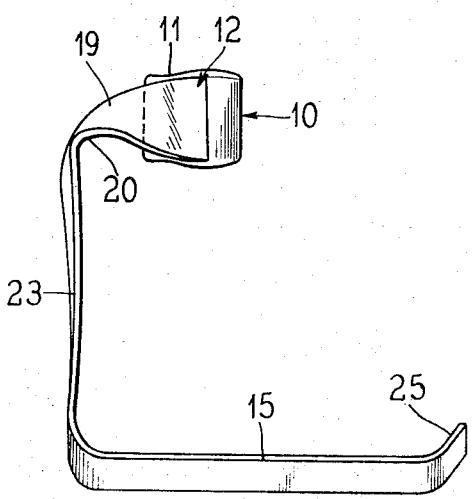
FIG. 3 is an end view of the tool looking at the tool generally along line III—III of FIG. 1.

A pistol-grip hand garden hoe 10 constructed in accordance with the principles of the present invention is generally shown in the drawings. The hoe has a generally pistol-grip balanced handle 11, which may be formed from wood, metal or a molded plastic material, and is herein shown as being made from a molded plastic material of a length sufficient to afford a comfortable grip for the average hand and to be so arranged relative to the tool as to enable the tool to be balanced at the front of the handle. The handle 11 is relatively narrow at its rear or outer end to form a convenient grip for the hand and has a blade portion 12 imbedded or otherwise mounted therein and extending therefrom, closer to an inner side 13 of said handle than the outer side of said handle, to position said inner side of said handle closely adjacent the transverse center of a hoeing blade 15, to facilitate drawing of the blade along the ground to accomplish a hoeing or cultivating operation, and reduce the tendency of the blade to twist laterally when effecting a hoeing or cultivating operation.

Figure 2:
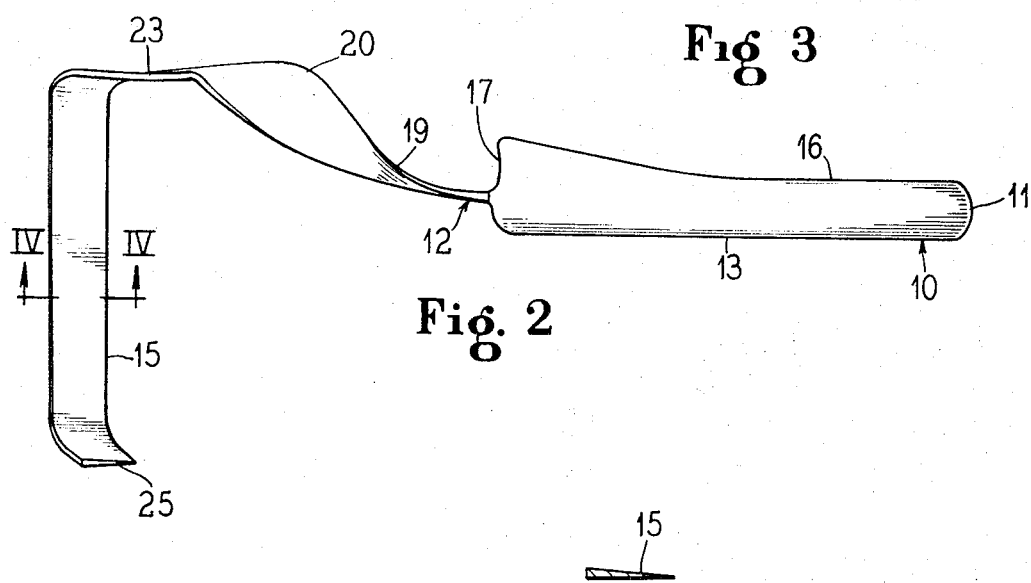
FIG. 2 is a generally top plan view of the tool shown in FIG. 1 with the hoeing blade portion generally parallel to the ground.

As shown in FIG. 2 of the drawings, an outer side 16 of the handle 11 diverges from the inner side 13 of said handle as it extends therealong and terminates into a generally right angled pistol-grip portion 17 extending to the blade portion 12 and slightly recessed, to generally conform to the form of the average index finger.

The blade portion 12 extends from the pistol-grip portion 17 in a generally vertical direction for a short portion of the length thereof when the tool is in a hoeing position, and then is twisted in a clockwise direction laterally of the handle for about two-thirds of a turn, as indicated by reference numeral 19. The twisted portion 19 of the blade is then rather sharply twisted in a clockwise direction to extend at right angles to the twisted portion 19, as indicated by reference numeral 20, to form a leg 23 extending angularly forwardly and downwardly from the twisted portion 19 and offset laterally from the outer side 16 of said handle and the pistol-grip shoulder 17 thereof.

The leg 23 is then bent at right angles to form the hoe blade 15, extending across the tool, at a digging or cultivating angle with respect to the ground when the handle 11 is in a horizontal position with respect to the ground, as shown in FIG. 1. The hoe blade 15 extends across the tool with the handle close to the transverse center thereof to avoid twisting of the hoe blade when drawing it in a straight line direction, and relieve the hand from lateral twisting forces during cultivating. The double twists 19 and 20 reinforce and stiffen the support blade 12, leg 23 and hoeing blade 15 and besides positioning the leg 23 laterally of the handle, enable the blade to withstand relatively heavy side and downward thrusting actions without deforming.

The outer end of the hoe blade 15 is turned upwardly as indicated by reference numeral 25 to further stiffen the blade and enable the upturned end of the blade to be drawn into contact with a weed or the like and either draw the weed from the ground or cut the weed flush with the ground.

Figure 4:
FIG. 4 is a transverse fragmentary sectional view taken through the hoeing blade substantially along line IV—IV of FIG. 2.

FIGS. 2 and 4 show the hoe blade 15 and upstanding end 25 as converging from the outer or upper to the lower or inner end thereof to provide a sharpened hoeing edge. This may be attained by grinding or by grinding and honing.

It may be seen from the foregoing that a simplified form of hoeing or cultivating device has been provided for hand use in close spaces in gardens and that the hoeing edge and its support is made from a single piece of light gauge metal bent at different curvatures to give rigidity to the metal and enable a lighter gauge of metal to be used than formerly without undesired bending thereof, during rough usage, and that the ease in manipulation of the device is attained by a pistol-grip handle encapsulating the rear end portion of the blade and so arranged that the bulk of the forces of hoeing or cultivating are taken directly by the index finger on the pistol-grip handle, drawing the hoe or cultivator along the ground. It should also be understood that the sharpened blade of the hoe may be used as a sickle and if desired, the right angled leg portion extending from the handle to the hoe blade may be sharpened to aid in cutting with a sickle-like action.

I claim as my invention:

1. A hand-held garden hoe comprising:
a handle having an inner side with a substantially flat surface and an outer side opposite said inner side,
a blade support member having a flat portion carried in said handle to extend from one end thereof with said flat portion being substantially parallel to said inner side,
a hoe blade formed as an integral part of said blade support member and extending at generally right angles with respect to said handle, said blade support member being provided with an offset portion so that the hoe blade is at generally a right angle to said handle and lies in a plane forming an acute angle with respect to the ground when said handle is in a generally horizontal operative position,
said inner side of said handle being closely adjacent a vertical plane extending through the transverse center of said hoe blade to position the handle over the hoe blade and facilitate the attaining of a straight line hoeing action by pulling on said handle,
said outer surface diverging adjacent said one end to provide a shoulder having a recess facing in the general direction of the hoe blade to afford means to draw the blade along the ground by the index finger as the hand extends about said handle.

2. A hand-held garden hoe of claim 1,
wherein the blade support member and hoe blade are made from a strip of thin sheet steel, and
wherein the hoe blade has a ground engaging edge sharpened to provide a digging and cultivating edge.

3. A hand-held garden hoe according to claim 1, wherein said offset portion has a twist in the form of a double curve to provide a leg extending at an inclined angle to the handle.

4. A hand-held hoe of claim 1,
wherein the blade support member is carried within the handle closer to the inner than the outer side thereof, and
wherein a double bend is placed in said blade support member terminating in a right angled bend to form a blade leg portion supporting the hoe blade to extend at right angles to said leg portion.

5. A hand-held hoe of claim 4,
wherein the end of the blade is upwardly turned to rigidify the blade and provide a weed grasping surface for grasping and cutting and digging weeds and the like.

6. A hoe according to claim 5, wherein said handle is of a weight and shape whereby said tool is balanced about a point just forward of the handle.

* * * * *